No. 836,185. PATENTED NOV. 20, 1906.
J. FROELICH.
AUTOMATIC MEASURING MACHINE.
APPLICATION FILED SEPT. 29, 1905.

3 SHEETS—SHEET 1.

Figure 1:
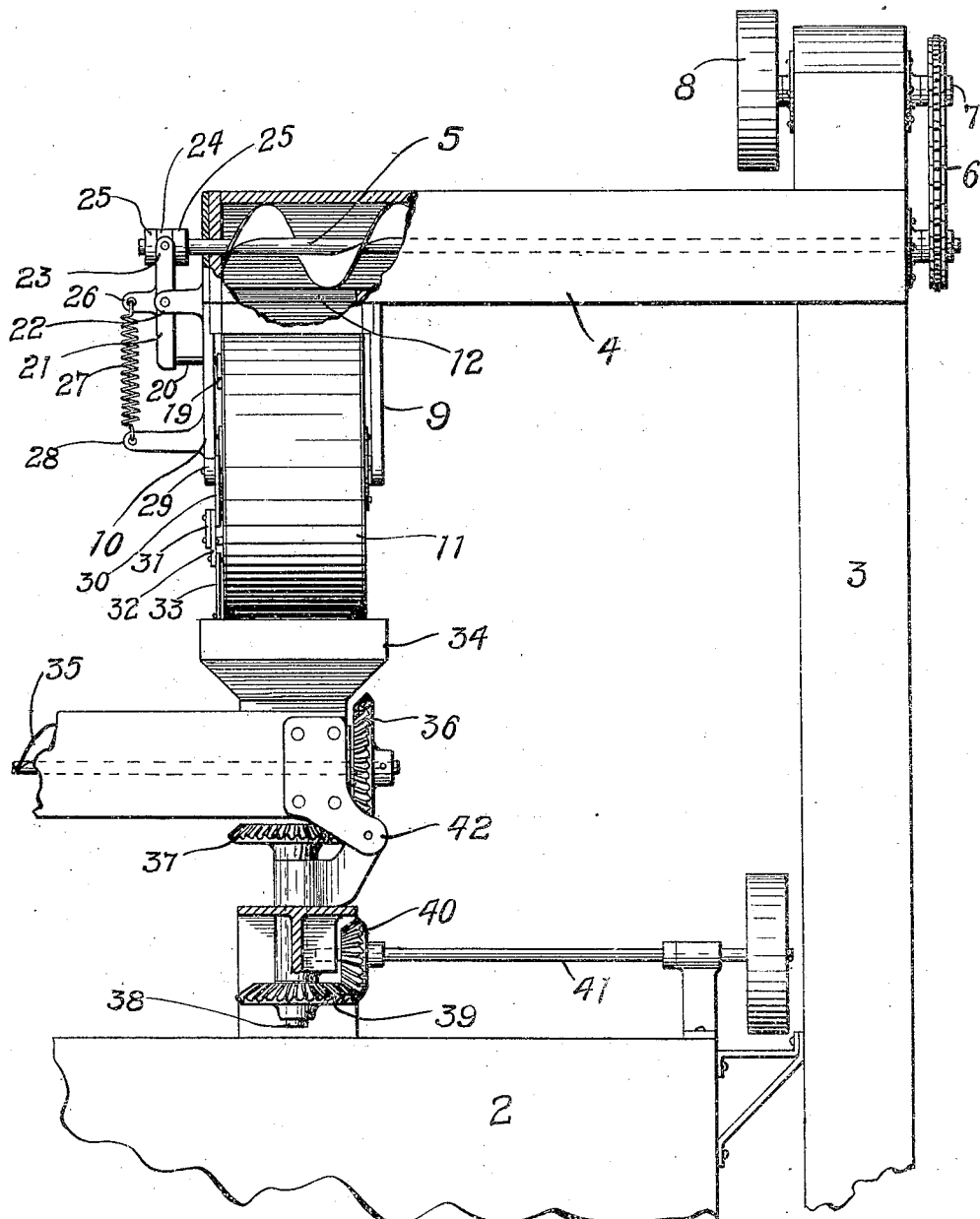

WITNESSES. Fig 1. INVENTOR
JOHN FROELICH.
BY
HIS ATTORNEYS.

No. 836,185. PATENTED NOV. 20, 1906.
J. FROELICH.
AUTOMATIC MEASURING MACHINE.
APPLICATION FILED SEPT. 29, 1905.

3 SHEETS—SHEET 2.

WITNESSES.

INVENTOR
JOHN FROELICH.
BY Paul & Paul
HIS ATTORNEYS.

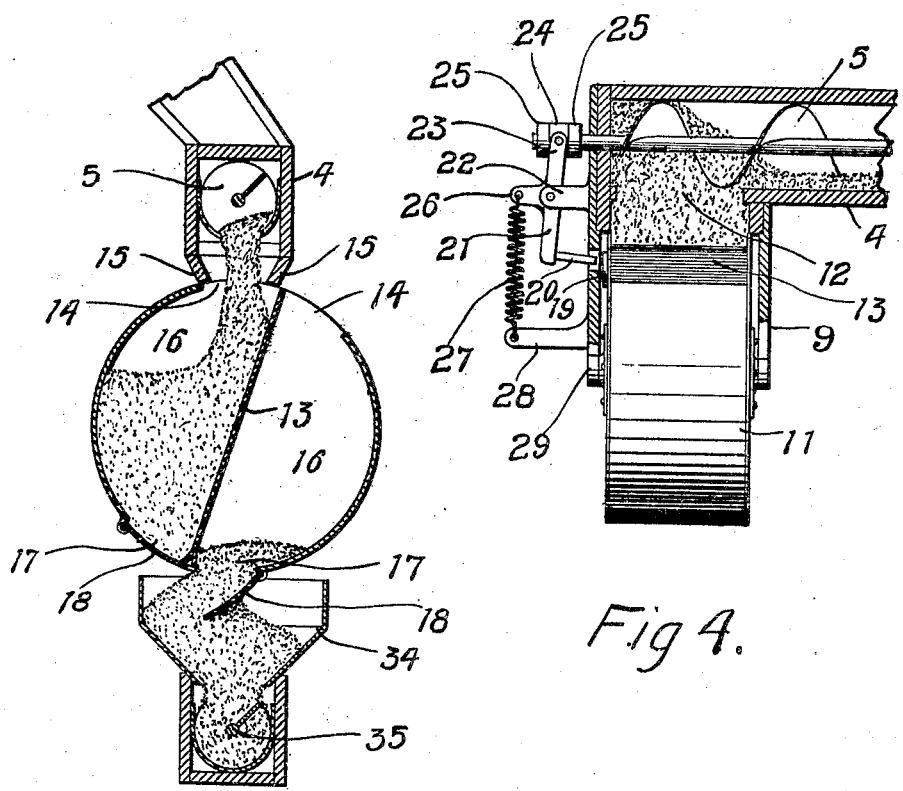

UNITED STATES PATENT OFFICE.

JOHN FROELICH, OF ST. PAUL, MINNESOTA.

AUTOMATIC MEASURING-MACHINE.

No. 836,185.          Specification of Letters Patent.          Patented Nov. 20, 1906.

Application filed September 29, 1905. Serial No. 280,600.

*To all whom it may concern:*

Be it known that I, JOHN FROELICH, of St. Paul, Ramsey county, Minnesota, have invented certain new and useful Improvements in Automatic Measuring-Machines, of which the following is a specification.

My invention relates to measuring-machines designed, primarily, for an attachment to a threshing-machine, but is also adapted for use with any other machine for measuring cereals or their products.

The object of my invention is to provide a measuring-machine of very simple construction and one that will be strong and durable and having no delicate parts and is not liable to get out of order.

A further object is to provide a machine the accuracy of which will not in any way be impaired by dust or dirt or the vibration or motion of the machine.

The invention consists generally in an automatic measuring-machine controlled in its operation by the bulk of the material to be measured instead of by the weight of the same, whereby no adjustments are required to adapt the machine for measuring different kinds of cereals.

Further, the invention consists in various constructions and combinations, all as hereinafter described, and particularly pointed out in the claims.

Figure 2:
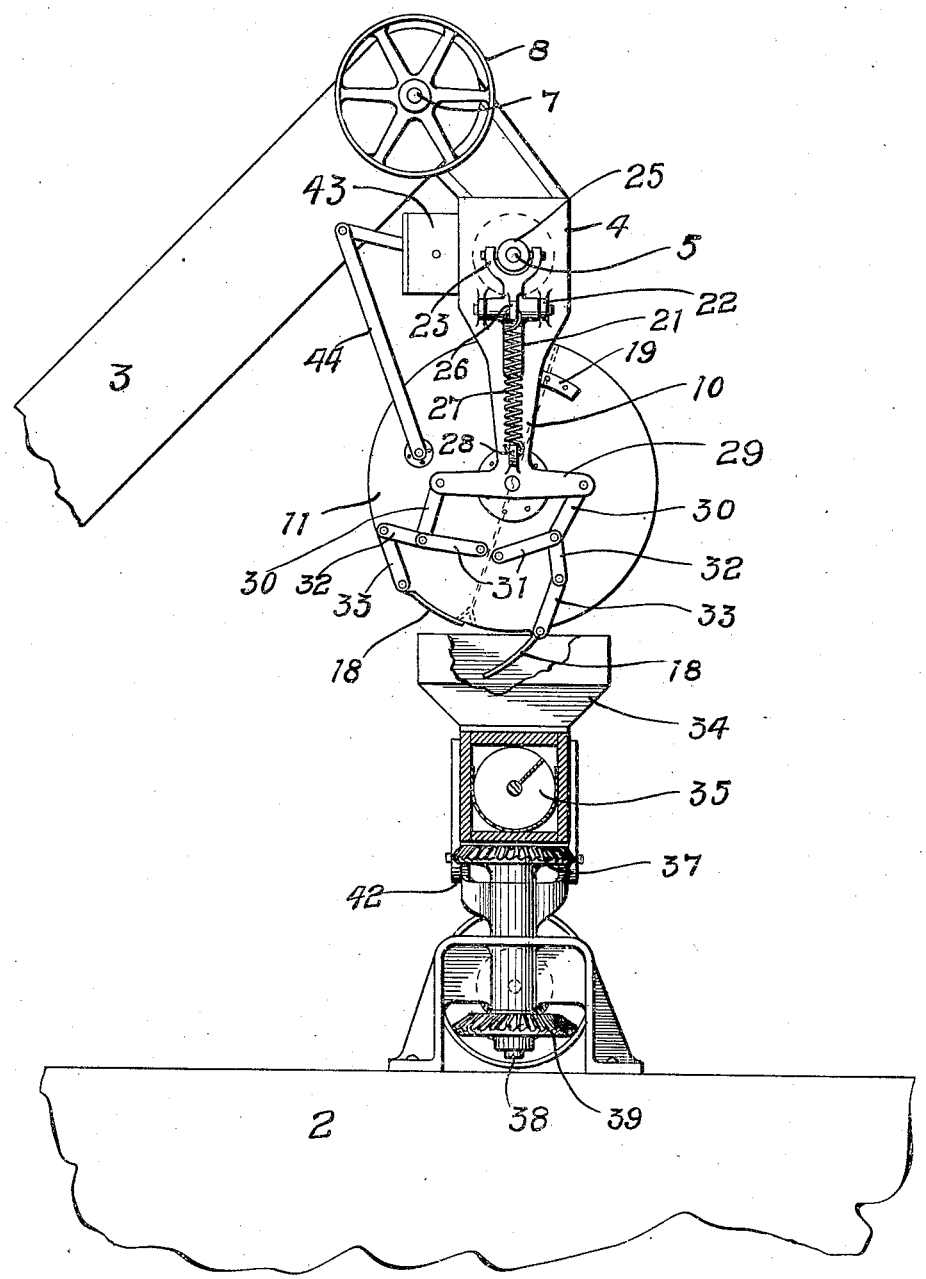

In the accompanying drawings, forming part of this specification, Figure 1 is a side elevation, partially in section, of a measuring-machine embodying my invention. Fig. 2 is an end view of the same. Fig. 3 is a vertical sectional view through the measuring drum or cylinder and showing the manner of delivering the material to be measured thereto and discharging it from the cylinder. Fig. 4 is a detail sectional view illustrating the manner of feeding the material to the drum.

In the drawings, 2 represents a portion of a separator-casing; 3, the elevator wherein the grain is raised to a higher lever after the threshing operation, and 4 a horizontal casing wherein a screw conveyer 5 is arranged, driven by a sprocket-chain 6 from a shaft 7, having a pulley 8. Hangers 9 and 10 depend from one end of the casing 4, and a drum or cylinder 11 is pivotally supported at the lower ends of said hangers and has an oscillating movement between them beneath a discharge-opening 12 in the bottom of the casing 4. The drum 11 is provided with a centrally-arranged partition 13, upon each side of which at the top of the drum are receiving-openings 14, which are adapted to coincide with the opening in the bottom of the casing 4, and the wall of the drum around the said openings 14 is adapted to engage stops 15, provided on each side of the opening 12, and limit the oscillation of the drum. The partition 13 divides the said drum into two compartments 16 of equal size or capacity, and each compartment is provided in the bottom of the cylinder with a discharge-opening 17, closed by a hinged door 18.

A stop 19 is secured to one end of the drum, and a pin 20 is provided on the lower end of a lever 21, that is centrally pivoted on an arm 22, and has a forked upper end 23, pivoted on a ring 24, which is loosely mounted between collars 25 on the shaft of the screw conveyer 5. A lug 26 is provided on the lever 21 and connected by a spring 27 with an arm 28 on the hanger 10. The tension of this spring normally holds the pin 20 in engagement with the stop 19 to lock the drum against oscillation in one direction. The shaft of the screw conveyer 5 has a longitudinal movement in its bearings, and when a sufficient amount of material has accumulated between the spiral of the screw and the end of the casing the conveyer will be moved lengthwise and the lever 21 oscillated to withdraw the pin from engagement with the stop. This, however, will not happen until the compartment into which the conveyer is discharging the material is filled to overflowing, and the material in consequence accumulates at the end of the conveyer. As soon as the drum is released the weight of the material will tilt it on its pivots and bring the empty compartment into position to receive the grain or other material from the conveyer. The hanger 10 is provided at its lower end with horizontal arms 29, and upon these arms links 30 are pivoted and connected by links 31 with a fixed point on the end of the drum, preferably about midway between its center and periphery, and by links 32 and 33 with the pivots of the doors 18, respectively. When the drum is oscillated to the position shown in Fig. 3, for instance, the links on the left hand of the partition 13 will be thrown to the position indicated in Fig. 2, and the door connected with such links will be closed and the opening in the top of the drum leading to this compartment will coincide with the hopper-opening, and the compartment will be ready to be filled. As soon as the compartment is filled and the drum is released through the pressure of the grain and oscillated on its pivot the links will be thrown to the position also shown in Fig. 2 and the door in the bottom of the compartment opened to allow the discharge of its contents. A hopper 34 is provided beneath the drum in convenient position to receive the grain, and a screw conveyer 35 communicates with said hopper and may be extended to a wagon or bin into which it is desired to deposit the grain. This last-named screw conveyer has a gear 36, meshing with a similar gear 37 on a short upright shaft 38, that is driven through gears 39 and 40 from the horizontal shaft 41. The conveyer 35 has a hinge 42 to allow it to be swung on the shaft 38 from one side of the machine to the other. The trap-doors in the bottom of the drum are locked when in their closed position and do not in any way interfere with the free oscillation of the drum.

I prefer to provide a register or tally device 43, having a connection 44 with the end of the drum, so that each oscillation or movement of the drum will actuate the tally and register the number of times the compartments are filled. The drum may of course be made of any suitable size. I prefer, however, to make each compartment with a capacity of half a bushel, so that the filling and emptying of both compartments will represent one bushel and cause one operation of the register.

With this apparatus it will be immaterial what kind of grain is being measured or how many pounds it may weigh per bushel. The operation of the drum depends upon the bulk entirely and is in no way affected by the variation in weight of the material, and consequently no delicate adjustments are necessary to render the apparatus suitable for measuring different kinds of grain, and there can be no danger of a premature operation of the drum through the jarring or vibration of the threshing-machine.

I claim as my invention—

1. The combination with a threshing-machine and its grain-elevator, of a casing connected therewith, a screw conveyer provided in said casing, an oscillating measure arranged to receive the grain from said conveyer and divided into compartments having filling and discharge openings, doors for said discharge-openings, means for normally locking said doors in their closed position and releasing them one at a time when said measure is oscillated, means for locking said measure against premature movement, the pressure of the material upon the filling of the compartments operating upon said conveyer to trip said locking means.

2. The combination with an elevator, of a casing connected therewith, a screw conveyer operating in said casing and having a longitudinal movement in its bearings, a pivoted measure divided into compartments having filling and discharge openings and arranged to receive the grain alternately from said conveyer, means comprising a longitudinally-movable pin for locking said measure against premature movement, said conveyer shifting by the pressure of the material upon the filling of the compartments to trip said locking means, means comprising a lever having one end attached to said pin and its other end to said conveyer and for temporarily closing said discharge-openings, and means for opening said closing means alternately when said measure is oscillated.

3. The combination with means for feeding grain, of a pivoted drum having its interior divided into compartments of equal capacity, each compartment having a filling-opening and a discharge-opening and a door for normally closing the same, a locking device arranged to prevent the premature tilting of said drum, and toggle-links connected with a fixed point and with said door and with a point on said drum intermediate to its center and said door whereby the door will be alternately opened and closed when said drum is oscillated, substantially as described.

4. The combination with a feeding means, of an oscillating measure divided into two compartments of equal capacity, each compartment having a filling and a discharge opening, doors for said discharge-openings, means for normally locking said doors in their closed position and releasing them one at a time when said measure is oscillated, and means for normally locking said measure against oscillation, the pressure of the material upon the filling of the compartments operating upon said feeding means to trip said locking means.

5. The combination with a casing having receiving and discharge openings, of a screw conveyer provided in said casing, an oscillating measure divided into compartments each having a filling and discharge opening, doors for said discharge-openings, means for normally locking said doors in their closed position and releasing them one at a time when said measure is oscillated, means for normally locking said measure against oscillation, the pressure of the material between said conveyer and casing upon the filling of the compartment, operating to trip said locking means.

In witness whereof I have hereunto set my hand this 22d day of September, 1905.

JOHN FROELICH.

Witnesses:
 RICHARD PAUL,
 C. MACNAMARA.